E. H. Stearns,
Rossing Bark.
Nº 27,081.  Patented Feb. 7, 1860.
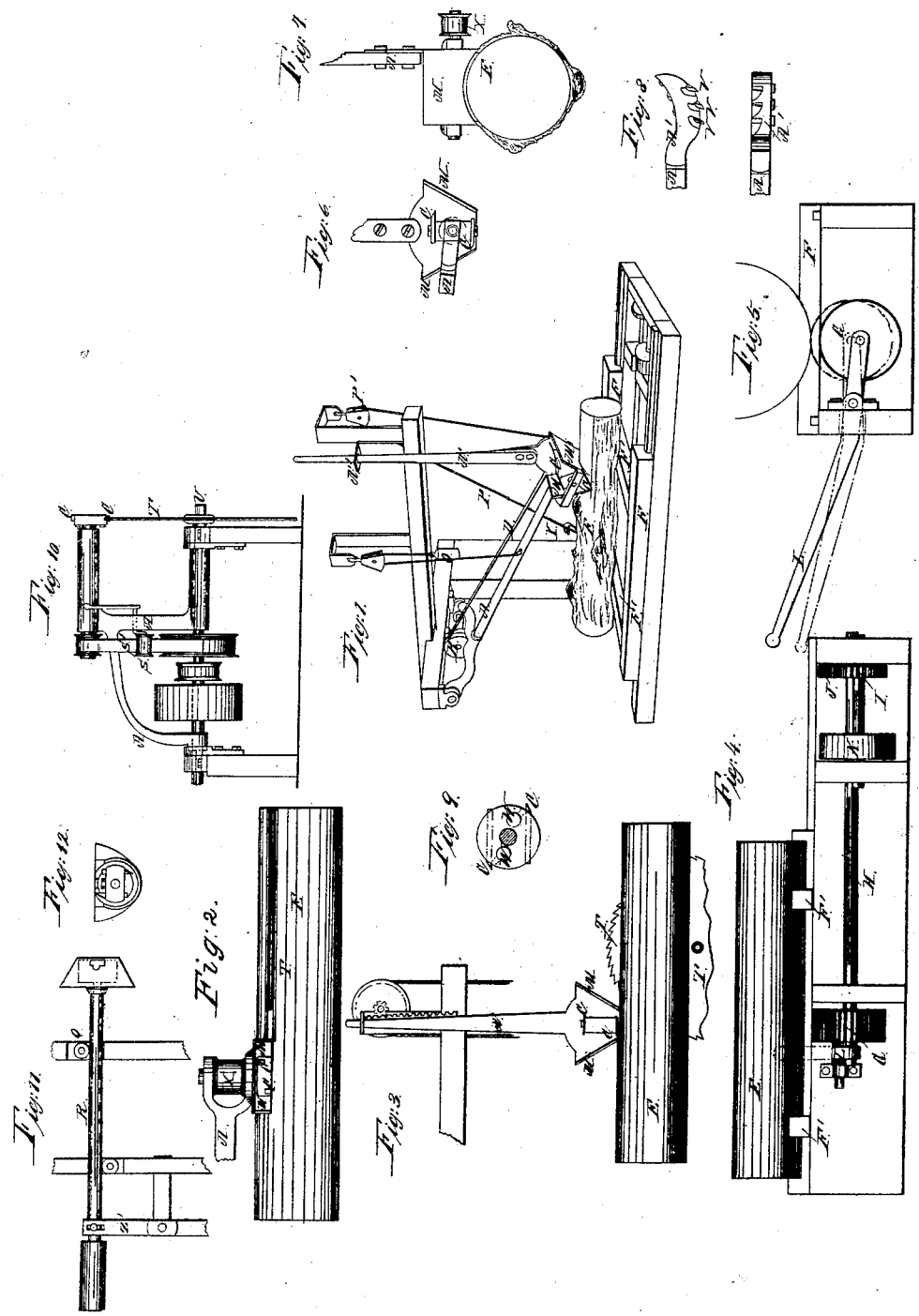

UNITED STATES PATENT OFFICE.

E. H. STEARNS, OF CINCINNATI, OHIO.

METHOD OF ROSSING SAW-LOGS.

Specification of Letters Patent No. 27,081, dated February 7, 1860.

*To all whom it may concern:*

Be it known that I, E. H. STEARNS, of Cincinnati, in the county of Hamilton and State of Ohio, have invented a new and useful Improvement in Rossing Machinery; and I do hereby declare that the following is a full and exact description thereof, reference being had to the accompanying drawings, and to the letters of reference marked thereon, made to form a part of this specification.

The nature of my invention relates to certain improvements, in machinery for rossing logs, which may be represented and described as follows:

With reference to the accompanying drawings, Figure 1, is a perspective representation of my improvements as applied to prepare logs for sawing previously to, or separately from, the sawing operation. Fig. 2, is a plan representing it as arranged to operate simultaneously with the saw, and Fig. 3, is an elevation representing the same arrangement. Fig. 4, is a sectional elevation to represent, and illustrate the operation of, the device for turning the log, in the machine for preparing the logs previously to the sawing operation. Fig. 5, is an elevation of the same, viewed end wise. Figs. 6, and 7, are detail views of the cutters and parts connected therewith as arranged to operate for the same purpose. Fig. 8, is two views representing the stock A', as furnished with drawing cutters instead of rotary ones. Fig. 9, shows an end view of a rotary cutter head with throats to conduct the chips to channels W, opening and discharging at the end. Fig. 10, is a view representing the improvement as applied to operate simultaneously with the saw, and in which the swinging frame A, is pivoted to the saw-arbor *u*, or its bearings.

A, is a carrier-frame pivoted concentrically with any suitable driving shaft and pulley B, and carrying the rotating cutters C. The cutters C, are driven by a belt D, passing from pulley B, around a pulley X, connected to the arbor carrying the cutters.

E, is a log arranged in suitable resting places formed upon the carriage F, and is moved back and forth to be subjected to the operation of the cutters in any of the usual methods, employed in mills for operating the carriage.

G, is a roller or wheel furnished with a suitable rough surfaced periphery and fixed upon shaft H, and is made to rotate at a suitable speed by means of gears I, J, and the pulley K. One end of shaft H, may be furnished with a pivoted bearing, while the other has its bearing in the end of lever L, by means of which it may be elevated or depressed at the pleasure of the operator, to bring the roller G, into contact with the log with sufficient force to turn the log, in its resting blocks F'. The rest blocks F', may have a removable section to allow the log to be easily rolled off or on to the carriage.

M, M, are guards set in an angular position upon the rod N, which is jointed concentrically with the axis of the cutter-head, to it or the carrier A, or both and is guided vertically at N', to secure their proper action with reference to the irregular surface of the log. These guards serve to control the action of the cutters, preventing them from cutting into the log an unsuitable depth, and carrying them safely over any protuberances or depressions occurring in the log's surface. The cord pulley and weight O, serve to support a portion of the weight of the parts so that they can be easily raised at the pleasure of the operator by means of the cord and pulley P P'. This cord P, may have a series of knots any one of which may be easily caught in a suitable claw Y, and as easily detached. The cutter carrier A, may also be controlled with reference to the surface of the log by the operator by means of a rack and pinion as illustrated in Fig. 3, with or without the guards M, and whether the carrier is arranged to slide vertically as illustrated in Fig. 11, or pivoted and made to swing as shown in Fig. 1.

Figs. 11, and 12, illustrate an arrangement of the cutters to rotate in a horizontal plane, and also an arrangement of friction rolls to guide the cutter shaft when arranged to slide vertically. The lower friction roll Q, is arranged on the side of the shaft opposite to the direction from which the log moves while being operated upon. The cutter carrier, may also be operated vertically with reference to the surface of the log by means of a lever Z', acting upon a pin fixed to the hollow sleeve R, inclosing the shaft which carries the cutter head as illustrated in Fig. 11. When the cutters are arranged to operate simultaneously with the saw as illustrated in Figs. 2, 3, and 10, the carrier A, may be pivoted as shown in Fig. 1, or it may be pivoted concentrically with the saw arbor as shown in Fig. 10. In the latter case the carrier A, may be controlled by the hand of the operator directly as it is quite accessible, or by means of other devices already described with, or without the guards M.

S, Fig. 10, is a tightening pulley by means of which the loose belt S', may be thrown into action to give motion to the cutter head and cutters C, by transmission from the saw arbor $u$. The carrier A, Figs. 1, and 10, is peculiarly adapted to be used in connection, and simultaneous operation, with circular saws, but on account of their movement longitudinally with reference to the track of the saw, their use in connection with reciprocating or vertical saws, becomes impracticable, and hence the necessity for the vertically sliding carrier illustrated in Fig. 11. The application of the pivoted swinging carrier is impracticable in connection with vertical saws because it is desirable to run the log backward only just far enough to allow the log to be set over past the edge of the saw, which would not allow sufficient space in which to operate it without contact with the saw, or, leaving a portion at the end of the log untouched. The rotary cutters when used simultaneously with the sawing operation are arranged at an angle with their plane of rotation so that the edge of the cutter may conform to the surface of the log sloping toward it. The edges of the cutters also may be formed at a similar angle for the same purpose.

The rotary cutters revolve in the direction to strike under their axis against the direction of motion of the log, so cutting outward and throwing the dirt upon the surface outward instead of cutting through it and ruining their edges, as would be the case with the saw, if made to operate upon the log without any preparation.

Fig. 8, represents the carrier A, furnished with drawing cutters V, instead of rotary ones. These are useful in many cases where the cost of rotary ones will not be afforded, and operate by the movement of the log in a manner similar to that of a common drawing knife or bench-plane, shaving the ross, bark, and dirt, from the surface of the log in advance of the cut of the saw.

T, is the saw and U, its arbor, a machine arranged as in Fig. 1, may be placed in the track, or path of the logs which are rolled along to the different carriages in a mill, and each one runs through under the rossing cutters as indicated in Fig. 1. Once going through removes a strip of ross and bark as shown, then the carriage is run back, the lever L, depressed at its outer end, and roll G, acts on the log to turn it more or less, according to the length of time, the operator holds the lever down, and he then runs it through again and repeats the operation, till the surface is gone over or such part of it as he desires. Thus one log being operated upon after another they are passed along to the several carriages and saws to be supplied. The plan of arranging the carrier A, upon the arbor U, or its bearings as in Fig. 10, is preferable for new mills, but as it can not so conveniently, if at all, be applied to mills in operation, or already built, it is necessary that recourse be had to the arrangement of it as in Figs. 1, 2. The operation as connected with the operation of sawing will be readily understood by reference to Fig. 2, in which the pivoted carrier A, is arranged for the rotary cutters to operate directly in advance of the saw, and being narrow they remove the ross and bark from a narrow path just sufficient for the saw kerf. This requires but very little expense of power. When the operation has progressed to the end of the log the operator by means of the cord P, and pulley, Fig 1, rack and pinion, Fig. 3, or by hand as explained with reference to Fig. 10, raises the cutters from the log and, fastens them up as explained with reference to Fig. 1, by cord P, or other means until the log is run back, then if required to operate further they are let down again. The several parts may be made of such suitable materials as are commonly employed for the class of work to which they belong.

Having described the construction and operation of my improvement what I claim as new and desire to secure by Letters Patent is—

1. The combination of the rotary and drawing cutters C, V, with a movable carrier A, or R, made governable with reference to the uneven surface of the log, substantially as and for the purpose set forth.

2. I claim the arrangement of the rotating roller G, in combination with the lever L, or its equivalent, so as to be operated thereby substantially as and for the purpose set forth.

In testimony of which invention I have hereunto set my hand.

E. H. STEARNS.

In presence of—
 H. E. CLIFTON,
 D. N. B. COFFIN, Jr.